United States Patent
Hollett et al.

(10) Patent No.: US 9,420,758 B2
(45) Date of Patent: *Aug. 23, 2016

(54) WASTE SCOOP CONTAINMENT SYSTEM

(71) Applicants: Lisa Elaine Hollett, Spartanburg, SC (US); Stephen Mark Hollett, Spartanburg, SC (US)

(72) Inventors: Lisa Elaine Hollett, Spartanburg, SC (US); Stephen Mark Hollett, Spartanburg, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/714,777

(22) Filed: May 18, 2015

(65) Prior Publication Data

US 2015/0245590 A1     Sep. 3, 2015

Related U.S. Application Data

(63) Continuation of application No. 14/146,669, filed on Jan. 2, 2014, now Pat. No. 9,033,382.

(60) Provisional application No. 61/748,338, filed on Jan. 2, 2013.

(51) Int. Cl.
*A01K 29/00*     (2006.01)
*A01K 1/01*      (2006.01)

(52) U.S. Cl.
CPC ...................... *A01K 1/0114* (2013.01)

(58) Field of Classification Search
CPC .. E01H 1/1206; A01K 23/005; A01K 1/0107; A01K 1/0114; A01B 1/02; F24B 15/06; A46B 17/04; B44D 3/125; B65D 51/32; A45D 34/045; A45D 40/265; A61L 2/26; A47K 1/09; E05B 73/0023
See application file for complete search history.

(56) References Cited

U.S. PATENT DOCUMENTS

| | | |
|---|---|---|
| 1,625,335 A | 4/1927 | Schneider |
| 2,234,021 A | 3/1941 | Castrique |
| 3,085,678 A | 4/1963 | Moore |
| 3,361,507 A | 1/1968 | O'Neil |
| 3,883,197 A | 5/1975 | Reid |
| 4,211,750 A | 7/1980 | Gillespie |
| 4,226,456 A | 10/1980 | Barnett |
| D363,575 S | 10/1995 | Torntore |
| 5,460,293 A | 10/1995 | Erickson |
| 5,580,111 A | 12/1996 | Bohn |
| 5,690,441 A | 11/1997 | McManus |

(Continued)

OTHER PUBLICATIONS

Information disclosure statement (IDS) Letter Regarding Common Patent Application(s), dated Jun. 11, 2015.

*Primary Examiner* — Stephen Vu
(74) *Attorney, Agent, or Firm* — Tillman Wright, PLLC; James D. Wright; David R. Higgins

(57) ABSTRACT

A containment system to safely store a waste scoop includes: an outer receptacle including a bottom surface, at least one side wall, an opening and a first coupling element; an inner receptacle including a bottom surface and at least one side wall housed within the outer receptacle and including an opening, wherein the inner receptacle is removable from the outer receptacle via the opening of the outer receptacle; a scoop assembly including a scoop, a handle, and a lid, wherein the scoop is housed within the inner receptacle and is removable from the inner receptacle via the opening of the inner receptacle; a compartment including a second coupling element for connecting the compartment to the outer receptacle via the first and second coupling elements; and a third and fourth coupling element to secure a planar surface of the lid to cover the opening of the outer receptacle.

19 Claims, 7 Drawing Sheets

(56) References Cited

U.S. PATENT DOCUMENTS

| | | |
|---|---|---|
| 5,711,564 A | 1/1998 | Campbell |
| 5,741,036 A | 4/1998 | Ring |
| 5,772,015 A | 6/1998 | Musiel et al. |
| 5,782,203 A | 7/1998 | Tennen |
| 5,829,603 A | 11/1998 | Martineau |
| 5,945,076 A | 8/1999 | Leonard et al. |
| 6,035,456 A | 3/2000 | Taylor |
| 6,234,549 B1 | 5/2001 | Brownell |
| 6,439,627 B1 | 8/2002 | Devane |
| D467,113 S | 12/2002 | Lin |
| 6,902,056 B2 | 6/2005 | Dotterman et al. |
| D508,608 S | 8/2005 | Huff |
| 6,976,661 B2 | 12/2005 | Lipscomb et al. |
| 7,047,907 B1 | 5/2006 | Johnston |
| 7,328,792 B1 | 2/2008 | Benson |
| 7,523,973 B2 | 4/2009 | Lin et al. |
| 7,908,681 B2 | 3/2011 | Nguyen et al. |
| 7,942,460 B2 | 5/2011 | Boskett et al. |
| 8,235,434 B2 | 8/2012 | Lipscomb et al. |
| 8,313,001 B1 | 11/2012 | Reid et al. |
| 8,342,321 B2 | 1/2013 | McAllan |
| 8,348,315 B2 | 1/2013 | Morris |
| 8,459,707 B2 | 6/2013 | Lipscomb et al. |
| 9,033,382 B2 | 5/2015 | Hollett et al. |
| 2002/0149215 A1 | 10/2002 | McLaughlin |
| 2012/0088089 A1 | 4/2012 | Zetouna et al. |
| 2014/0183886 A1 | 7/2014 | Hollett et al. |

WASTE SCOOP CONTAINMENT SYSTEM

CROSS-REFERENCE TO RELATED APPLICATIONS

The present application is a U.S. continuation patent application of, and claims priority under 35 U.S.C. §120 to, U.S. non-provisional patent application Ser. No. 14/146,669, filed Jan. 2, 2014 and entitled "WASTE SCOOP CONTAINMENT SYSTEM," which '669 patent application published Jul. 3, 2014 as U.S. Patent Application Publication No. US 2014/0183886 A1 and issued May 19, 2015 as U.S. Pat. No. 9,033,382, which '669 patent application, its publication, and the patent issuing therefrom are each expressly incorporated by reference herein in their entirety, and which '669 patent application is a U.S. non-provisional patent application of, and claims priority under 35 U.S.C. §119(e) to, U.S. provisional patent application Ser. No. 61/748,338, filed Jan. 2, 2013 and entitled "CAT LITTER SCOOP AND CONTAINER WITH CHILD-RESISTANT LID AND DEODORIZER," which '338 patent application is also expressly incorporated by reference herein in its entirety. The disclosure of the '338 patent application is contained in Appendix A, attached hereto, which is likewise incorporated by reference herein in its entirety, except that the definitions provided therein for the terms "cavity," "comprising," "including," "having," "connected," "coupled," "decoupled," "encapsulates," "excrement," "integral," "mating," "opening," "toddler," "touching," "system," and "vessel" shall be excised and ignored in favor of the standard definitions of such terms (unless otherwise defined herein).

COPYRIGHT STATEMENT

All of the material in this patent document is subject to copyright protection under the copyright laws of the United States and of other countries. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE PRESENT INVENTION

1. Field of the Present Invention

The present invention relates generally to the field of waste containment system for storing waste, and, more particularly to a toddler-deterrent containment system for a waste scoop.

2. Background

The use of indoor litter boxes to collect pet waste, including feces and urine (sometimes referred to collectively herein as "excrement"), is very well established. Although many people tend to associate cats with using a litter box, there exist various other household pets trained to use a litter box, including, for example, ferrets, rabbits, and even some dogs. The tool most often used to sift through a litter box and remove pet waste from a litter box is commonly referred to as a "litter scoop." The removal of the feces and urine from a litter scoop is often referred to as "cleaning" the litter box. However, sifting through a litter box with a litter scoop further contaminates all the litter in the litter box with potential disease-causing pathogens. Disease-causing pathogens may include, but are not limited to, bacteria, parasites, fungus, toxoplasmosis, *Escherichia coli*, and salmonella, all of which have been associated with exposure to animal excrement.

Certain products are known to be marketed as cat litter scoop retainers, holders, holsters, scoops with removable liners, or containers. For example, U.S. Pat. No. 7,047,907 to Johnston, U.S. Pat. No. 6,976,661 to Lipscomb et al., U.S. Pat. No. 5,782,203 to Tennen, and U.S. Pat. No. 5,460,293 to Erickson, each of which disclose a replaceable scoop head, a holder or housing for a cat litter scoop. The scoop may be fully exposed or partially contained within the holder. These known holders may be structured to minimize the release of the odor from the holder. Other holders permit air to pass therethrough to facilitate drying of the waste. However, the structures of such holders afford no means of deterring or prohibiting a toddler or others from unnecessarily touching a contaminated scoop and handle.

Accordingly, it is believed that a need exists for an improved waste scoop containment system, which is toddler-deterrent. Additionally, it is believed that a need exists for the safe storage of a waste scoop. It is believed that one or more of these needs and other needs are addressed by one or more aspects and features of the present invention.

SUMMARY OF THE PRESENT INVENTION

The present invention comprises a containment system to safely store waste and a pet waste scoop. Broadly defined, the present invention according to a first aspect includes a containment system to safely store waste and a waste scoop, including: an outer receptacle including a bottom surface, at least one side wall, an opening and a first coupling element; an inner receptacle including a bottom surface and at least one side wall housed within the outer receptacle and including an opening, wherein the inner receptacle is removable from the outer receptacle via the opening of the outer receptacle; a scoop assembly including a scoop, a handle, and a lid, wherein the scoop is housed within the inner receptacle and is removable from the inner receptacle via the opening of the inner receptacle; and a compartment including a second coupling element for connecting the compartment to the outer receptacle via the first and second coupling elements. Wherein when the scoop is housed within the inner receptacle and the inner receptacle is housed within the outer receptacle, the lid of the scoop assembly can be coupled to the outer receptacle so as to enclose the scoop and inner receptacle within the outer receptacle. Wherein when the scoop is housed within the inner receptacle and the inner receptacle is housed within the outer receptacle and coupled, the lid of the scoop assembly can then be decoupled from the outer receptacle. In features of this aspect, the scoop assembly includes a third coupling element. The outer receptacle further includes a fourth coupling element capable of being joined with the third coupling element to secure a planar surface of the lid to cover the opening of the outer receptacle. In a further feature of this aspect, the first coupling element includes at least one mechanical means to receive the second coupling element and abut a planar surface of the compartment. The second coupling element includes at least one mechanical means to receive the first coupling element and to abut a planar surface of the compartment to the outer receptacle. The compartment is removed from the outer receptacle by decoupling the first coupling element from the second coupling element. The first and second coupling elements are adapted to decouple for the replacement of an odor reduction or air fresher substance.

In a further feature of this aspect, the compartment includes a vent to continuously absorbs odor through the at least one vent. In yet a further feature of this aspect, the compartment includes a vent to continuously release air freshener through the at least one vent.

In a further feature of this aspect, when the first and second coupling elements are coupled together, the containment system is capable of deterring a toddler. When the third and fourth coupling elements are coupled together, the containment system is capable of deterring a toddler.

In a further feature of this aspect, the inner receptacle includes a protrusion extending inward or upward and adapted to remove any residual waste on the scoop when the scoop is moved against the protrusion. In yet a further feature, the inner receptacle is disposable and replaceable.

Broadly defined, the present invention according to a second aspect is a containment system to safely store a waste scoop, including: an outer receptacle, including a bottom surface, at least one side wall, an opening and a first coupling element; an inner receptacle housed within the outer receptacle and including a bottom surface, at least one side wall, an opening, wherein the inner receptacle is removable from the outer receptacle via the opening of the outer receptacle; a scoop assembly including a scoop, a handle, and a lid including a second coupling element, wherein the scoop is housed within the inner receptacle and is removable from the inner receptacle via the opening of the inner receptacle, and wherein the lid is connected to the outer receptacle, via the first and second coupling elements, so as to cover the opening of the outer receptacle and deter a toddler; and a compartment capable of containing an odor reduction or odor freshener element. When the scoop is housed within the inner receptacle, the inner receptacle is housed within the outer receptacle, and the lid of the scoop assembly is connected to the outer receptacle, the scoop and inner receptacle are enclosed within the outer receptacle. The inner receptacle includes at least one protrusion extending inwardly or upwardly and adapted to remove any residual waste on the scoop when the scoop is moved against the protrusion.

In a further feature of this aspect, the compartment further includes at least one vent for the odor reduction element to continuously absorb odor. In yet a further feature, the compartment includes at least one vent for the odor freshener element to continuously release an air freshener. In a further feature of this aspect, compartment is removably coupled to the outer receptacle or compartment is removably coupled to the lid.

In a further feature of this aspect, the first and second coupling elements are capable of being mechanically coupled and decoupled for coupling and decoupling of the lid and the outer receptacle together. The lid can further include a hinge or tether to connect the lid to the outer receptacle to provide a closure and access to the openings of the outer and inner receptacles. When the first and second coupling elements are coupled together, the containment system is capable of deterring a toddler.

Broadly defined, the present invention according to a third aspect is a containment system to safely store waste and waste scoop, including an outer receptacle, including an opening and a first coupling element; an inner receptacle housed within the outer receptacle including a bottom surface, at least one sidewall and an opening, wherein the inner receptacle is removable from the outer receptacle via the opening of the outer receptacle; a scoop assembly including a scoop, a handle, and a lid including a second coupling element, wherein the scoop is housed within the inner receptacle and is removable from the inner receptacle via the opening of the inner receptacle, and wherein the lid is connected to the outer receptacle, via the first and second coupling elements, so as to cover the opening of the outer receptacle; and a compartment capable of containing an odor reduction or air freshener substance. Wherein, when the scoop is housed within the inner receptacle, the inner receptacle is housed within the outer receptacle, and the lid of the scoop assembly is connected to the outer receptacle, the scoop and inner receptacle are enclosed within the outer receptacle. The inner receptacle includes at least one flexible protrusion extending inwardly or upwardly and adapted to remove any residual waste on the scoop when the scoop is moved against the protrusion. In a further feature of this aspect, the protrusions extend inwardly from opposing sides or upwardly from the bottom of the inner receptacle.

BRIEF DESCRIPTION OF THE DRAWINGS

Further aspects, features, embodiments, and advantages of the present invention will become apparent from the following detailed description with reference to the drawings, wherein.

DETAILED DESCRIPTION OF THE PREFERRED EMBODIMENTS

Figure 1:
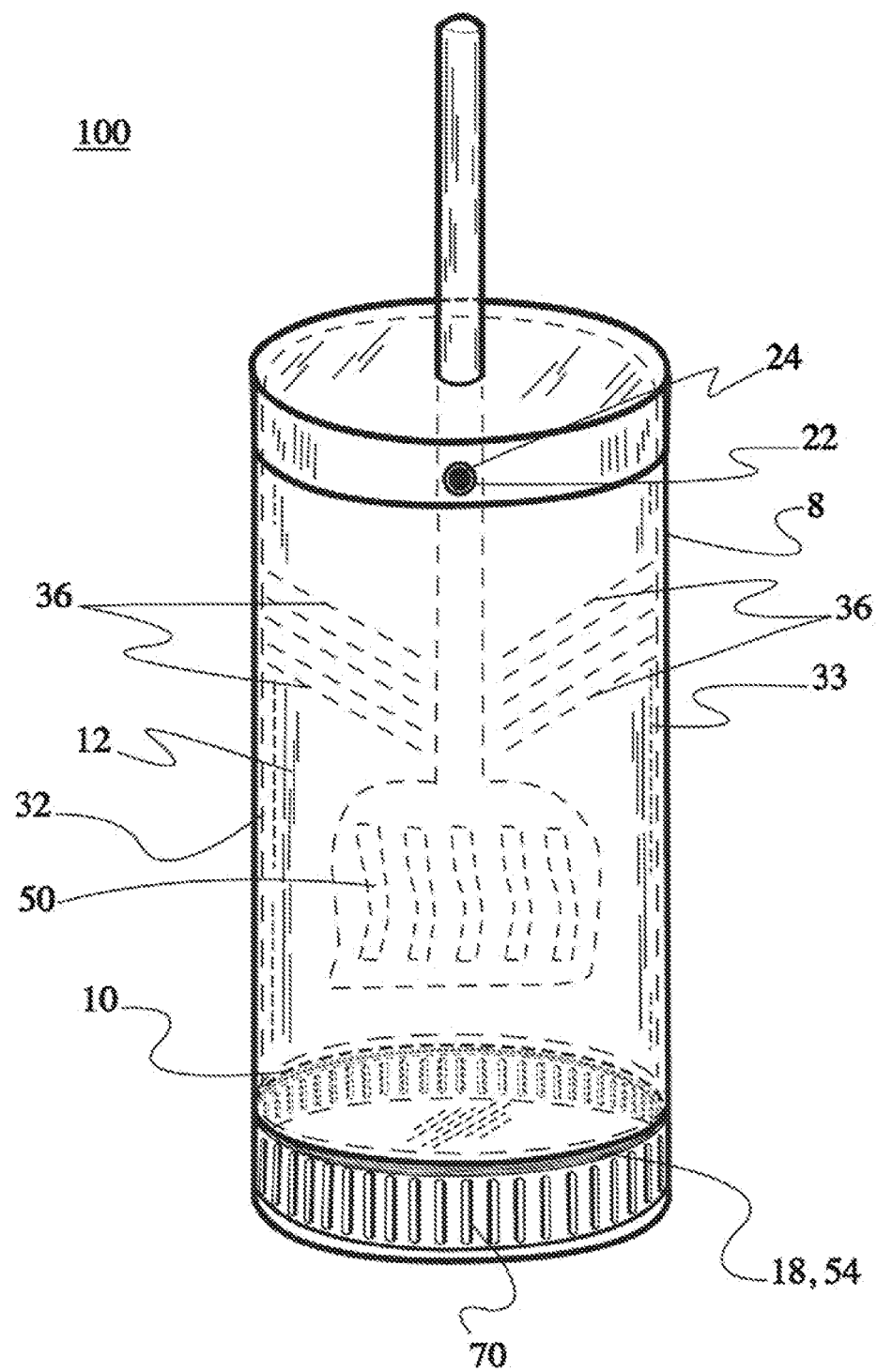
FIG. 1 is a front perspective view of a waste scoop containment system in accordance with a first preferred embodiment of the present invention.

As a preliminary matter, it will readily be understood by one having ordinary skill in the relevant art ("Ordinary Artisan") that the present invention has broad utility and application. Furthermore, any embodiment discussed and identified as being "preferred" is considered to be part of a best mode contemplated for carrying out the present invention. Other embodiments also may be discussed for additional illustrative purposes in providing a full and enabling disclosure of the present invention. Moreover, many embodiments, such as adaptations, variations, modifications, and equivalent arrangements, will be implicitly disclosed by the embodiments described herein and fall within the scope of the present invention.

Accordingly, while the present invention is described herein in detail in relation to one or more embodiments, it is to be understood that this disclosure is illustrative and exemplary of the present invention, and is made merely for the purposes of providing a full and enabling disclosure of the present invention. The detailed disclosure herein of one or more embodiments is not intended, nor is to be construed to limit the scope of patent protection afforded the present invention, which scope is to be defined by the claims and the equivalents thereof. It is not intended that the scope of patent protection afforded the present invention be defined by reading into any claim a limitation found herein that does not explicitly appear in the claim itself.

Thus, for example, any sequence(s) and/or temporal order of steps of various processes or methods that are described herein are illustrative and not restrictive. Accordingly, it should be understood that, although steps of various processes or methods may be shown and described as being in a sequence or temporal order, the steps of any such processes or methods are not limited to being carried out in any particular sequence or order, absent an indication otherwise. Indeed, the steps in such processes or methods generally may be carried out in various different sequences and orders while still falling within the scope of the present invention. Accordingly, it is intended that the scope of patent protection afforded the present invention is to be defined by the appended claims rather than the description set forth herein.

Additionally, it is important to note that each term used herein refers to that which the Ordinary Artisan would understand such term to mean based on the contextual use of such term herein. To the extent that the meaning of a term used herein—as understood by the Ordinary Artisan based on the contextual use of such term—differs in any way from any particular dictionary definition of such term, it is intended that the meaning of the term as understood by the Ordinary Artisan should prevail.

Furthermore, it is important to note that, as used herein, "a" and "an" each generally denotes "at least one," but does not exclude a plurality unless the contextual use dictates otherwise. Thus, reference to "a picnic basket having an apple" describes "a picnic basket having at least one apple" as well as "a picnic basket having apples." In contrast, reference to "a picnic basket having a single apple" describes "a picnic basket having only one apple."

When used herein to join a list of items, "or" denotes "at least one of the items," but does not exclude a plurality of items of the list. Thus, reference to "a picnic basket having cheese or crackers" describes "a picnic basket having cheese without crackers", "a picnic basket having crackers without cheese", and "a picnic basket having both cheese and crackers." Finally, when used herein to join a list of items, "and" denotes "all of the items of the list." Thus, reference to "a picnic basket having cheese and crackers" describes "a picnic basket having cheese, wherein the picnic basket further has crackers," as well as describes "a picnic basket having crackers, wherein the picnic basket further has cheese."

Referring now to the drawings, in which like numerals represent like components throughout the several views, the preferred embodiments of the present invention are next described. The following description of the preferred embodiment(s) is merely exemplary in nature and is in no way intended to limit the invention, its application, or uses.

FIG. 1 is a front perspective view of a waste scoop containment system 100 in accordance with a first preferred embodiment of the present invention. As shown, the system 100 includes an outer receptacle 8, an inner receptacle 32, an odor reduction compartment 70, and a scoop apparatus 50. It will be apparent to the Ordinary Artisan that the arrangement illustrated in FIG. 1 may be a preferred implementation of the system 100 described and illustrated herein. However, it will be appreciated that the system 100 of the present invention may be utilized with a variety of form or shapes, for example outer receptacle 8, inner receptacle 32, and scoop apparatus 50 may include flat or curved panels forming a container of various shapes; and toddler-deterrent elements 22,24 may be alternatively located on containment system 100, located on both sides of containment system 100, or alternatively may be used on one side, as described below. The toddler-deterrent elements can be achieved by any suitable means whereby coupling and decoupling toddler-deterrent elements are significantly difficult for toddlers younger than three years of age, or children with limited mental and/or physical abilities to engage or disengage, but engaging and disengaging toddler-deterrent elements are not difficult for normal functioning adults to use properly.

Figure 2:
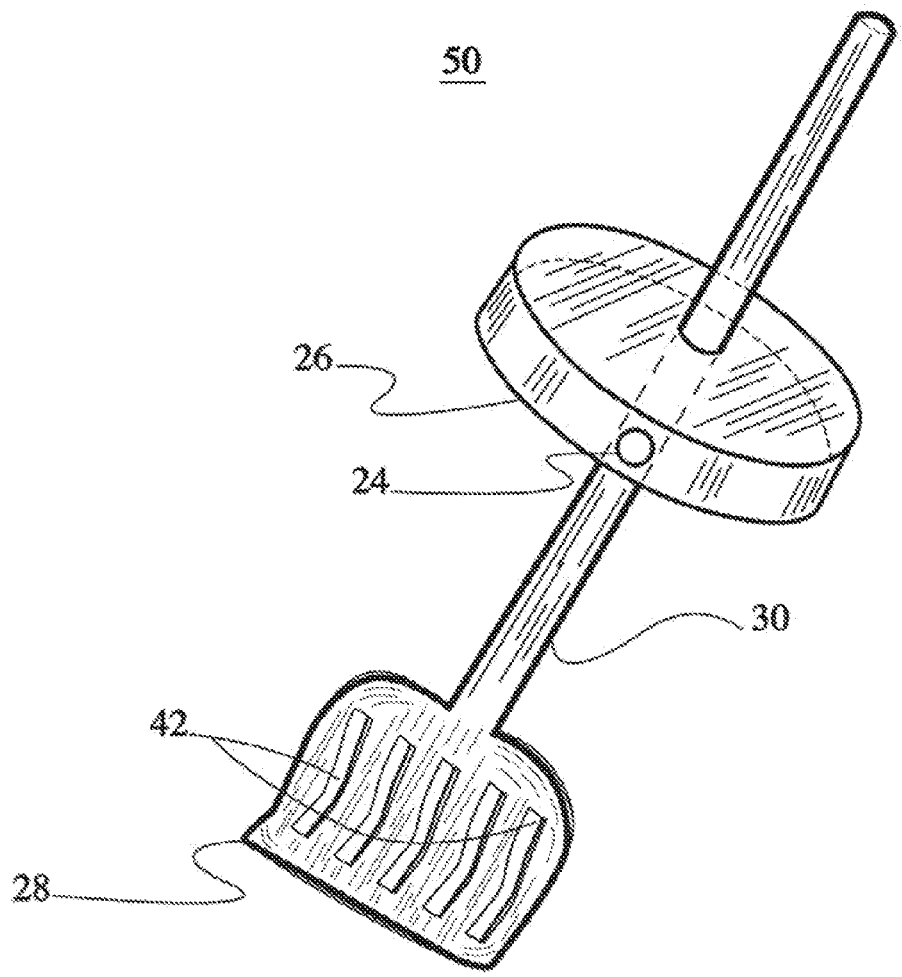
FIG. 2 is a front perspective view of the scoop apparatus of the waste scoop containment system of FIG. 1.

FIG. 2 is a front perspective view of the scoop apparatus 50 of the waste scoop containment system 100 of FIG. 1. The scoop apparatus 50 includes a scoop 28, a handle 30, and a lid 26. Each of the scoop 28, handle 30, and lid 26 is ideally constructed of a suitable durable metal, plastic or other material or combination of materials for strength and durability during use, longevity of the apparatus, and affordability to the common pet owner. The scoop apparatus 50 further comprises at least one suitable toddler-deterrent element 24 mechanically coupled or otherwise disposed approximate the lid 26 and mated to at least one suitable toddler-deterrent element 22 that is coupled to or otherwise disposed on an exterior surface 12 of the outer receptacle 8, as shown in FIG. 1, whereby the mated toddler-deterrent elements 22 and 24 are repeatably moveable between coupled and decoupled modes or positions. The lid 26 of the apparatus 50 is at least partly intended to provide a means of encapsulating the scoop element 28 and at least a portion of the handle 30 within the inner receptacle 32. The waste scoop element 28 includes a plurality of elongated slots 42 which are ideally narrow enough to retain waste (feces and clumps of urine soaked litter) removed from a litter box, but wide enough to permit loose pet litter to fall back into the associated litter box. Further, it will be appreciated that the scoop apparatus 50 of the present invention may be alternatively utilized to remove excrement from a variety of surfaces. For example, the scoop apparatus 50 may be used to remove excrement left by a dog on the ground or to remove excrement from a diaper. A used washable or reusable diaper may be scraped by the scoop apparatus 50 prior to being washed.

Figure 3A:
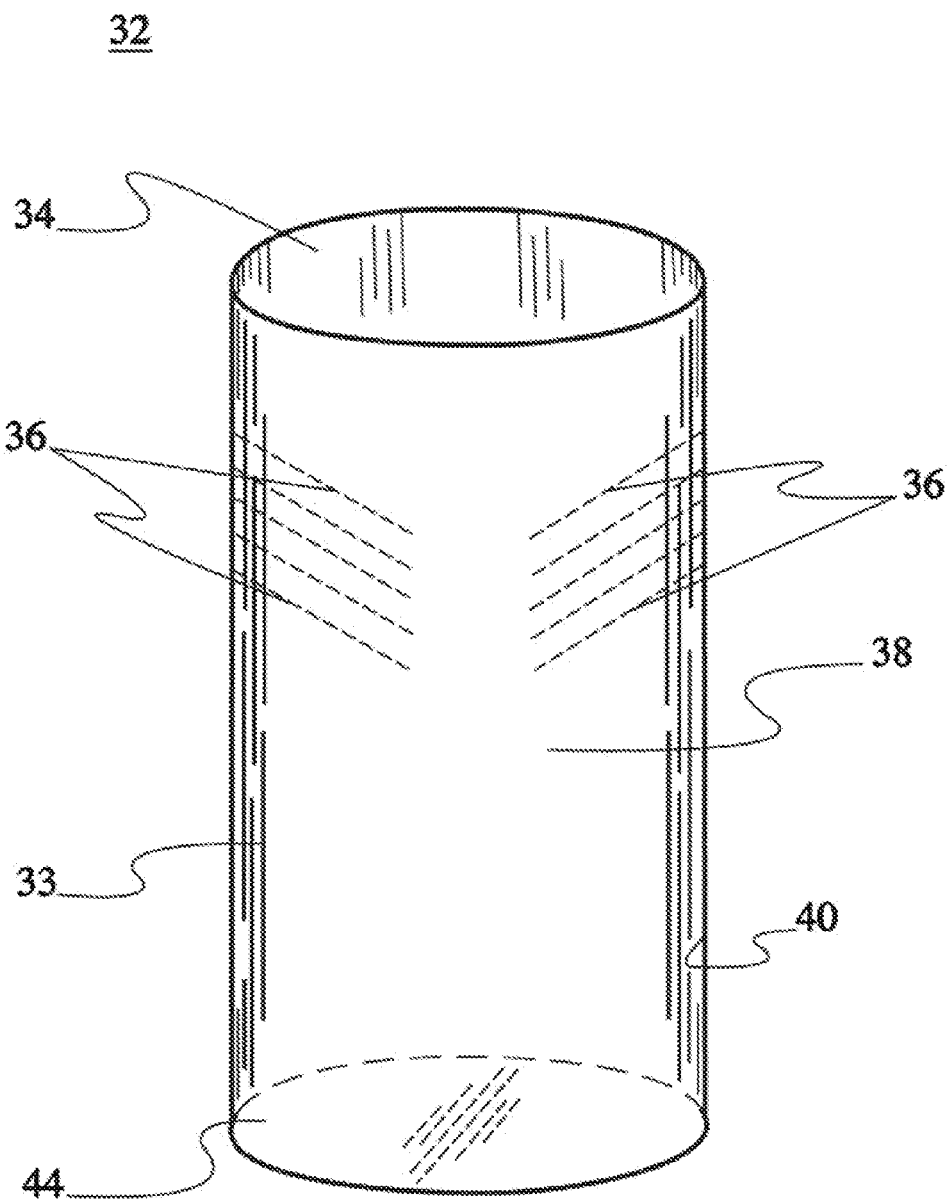
FIG. 3a is a front perspective view of the inner receptacle of the waste scoop containment system of FIG. 1.
Figure 3B:
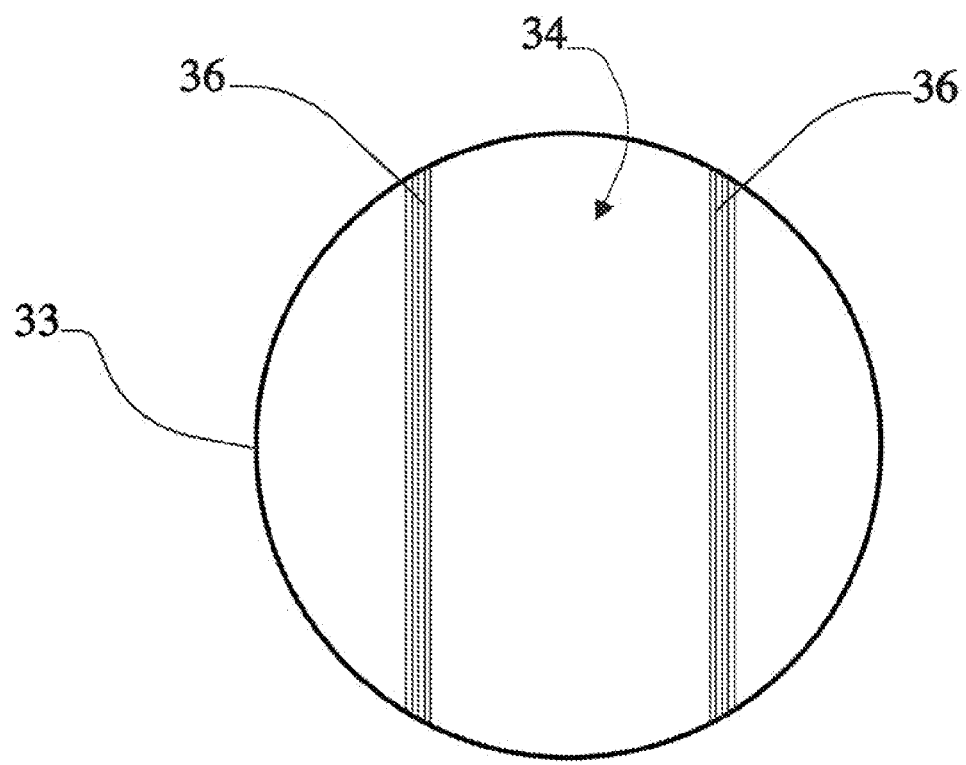
FIG. 3b is a top view of the inner receptacle of the waste scoop containment system of FIG. 1.

FIG. 3a is a front perspective view of the inner receptacle 32 of the waste scoop containment system 100 of FIG. 1. FIG. 3b is a top view of the inner receptacle 32 of the waste scoop containment system 100 of FIG. 1. The inner receptacle 32 is housed in a cavity 16 of the outer receptacle 8 and used as a liner. The inner receptacle 32 fits in the cavity 16 of the outer receptacle 8 via vertically downward placement through an open top 14 of the outer receptacle 8 and includes a bottom surface 44, at least one wall surface 33, an interior wall lining 40, an open top 34, and a scoop scraping element 36, the latter of which protrudes into a center cavity 38 of the inner receptacle 32 and is used to substantially remove any residual waste on the scoop apparatus 50. The scoop scraping element 36 may include at least one protrusion or a series of protrusions as shown in FIG. 3b. Further, it will be appreciated that the scoop scraping element 36 may be the same length or protrude into the center cavity 38 at various lengths. In at least one embodiment, the at least one protrusion is flexible so as to help facilitate cleaning of the scoop apparatus 50. In at least one embodiment, the at least one protrusion extends inwardly and/or upwardly in the inner receptacle 32. In at least one embodiment, the at least one protrusion extends upward from the inner receptacle 32.

The inner receptacle 32 mirrors the shape of the outer receptacle 8, but is slightly smaller in width and height. The inner receptacle 32 can be made of the same or of a different durable material used for the outer receptacle 8, but is ideally suited for a washable material such as plastic. The inner receptacle 32 fits in the cavity 16 of the outer receptacle 8 via vertically downward placement through the open top 14 of the outer receptacle 8. When the user places the scoop element 28 into the inner receptacle 32, the scoop element 28 comes into contact with the scoop scraping element 36, thereby substantially removing waste from the scoop 28, and subsequently retaining the scraped waste on the bottom surface 44 of the inner receptacle 32 until the owner empties, washes or otherwise cleans the inner receptacle 32. The extending scoop scraping element 36 is preferably an integral aspect of a plastic mold for the inner receptacle 32, but can alternatively be affixed to, touching, or coupled with the vertical interior wall lining 40 of the inner receptacle 32 by any suitable means mechanically adapted for cleaning, scraping, or grating residual waste stuck on the waste scoop including, for example, small pieces of sheet metal with wire bristles, or rollers with rough surfaces affixed to the interior wall 40 of the inner receptacle 32 using nails, screws, or adhesive. It will be appreciated that alternative and suitable means mechanically adapted for cleaning, scraping, or grating waste stuck on the waste scoop 50 can be used.

The inner receptacle 32 can be removed from the outer receptacle 8 for emptying the collected waste and cleaning. The clean inner receptacle 32 can be placed within the outer receptacle 8 and reused. Further, it will be appreciated that the inner receptacle 32 can be disposable and replaceable.

Figure 4:
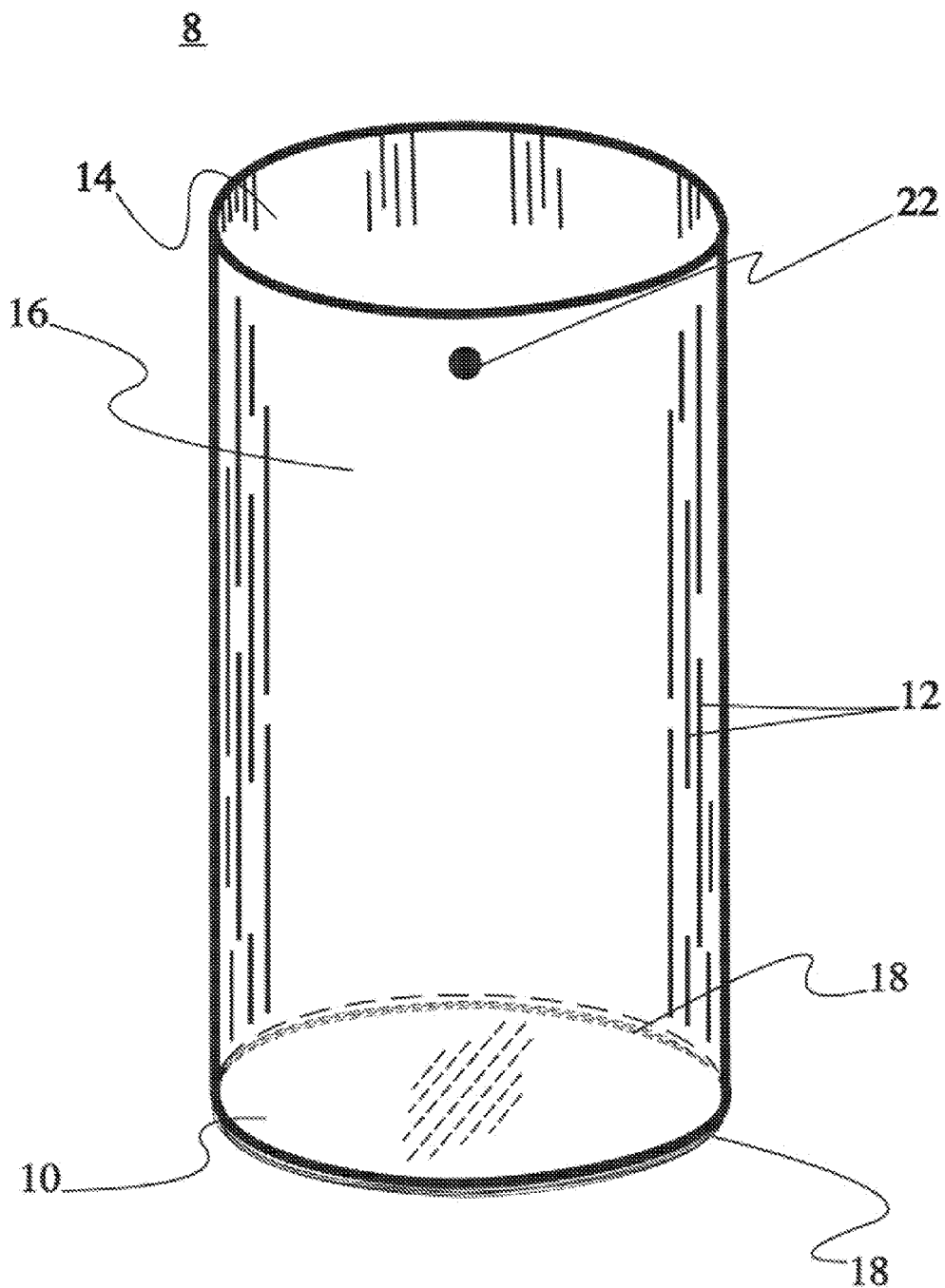
FIG. 4 is a front perspective view of the outer receptacle of the waste scoop containment system of FIG. 1 shown with a deterrent element.

FIG. 4 is a front perspective view of the outer receptacle 8 of the waste scoop containment system 100 of FIG. 1, shown with a toddler-deterrent element 22. The outer receptacle 8 includes the bottom surface 10, the at least one wall surface 12, the open top 14 through which the inner receptacle 32 enters the outer receptacle 8, the cavity 16 in which the inner receptacle 32 is housed, and threaded grooves 18 that are mechanically adapted for the coupling and removal of the vented odor reduction compartment 70 therein via mated threaded grooves 54 (see FIG. 5). The outer receptacle 8 further comprises at least one suitable means of a toddler-deterrent element 22, mechanically coupled to or otherwise disposed on the exterior wall surface 12 of the outer receptacle 8, which is mated to at least one suitable means of a toddler-deterrent element 24 coupled to or otherwise disposed on the lid 26 in a suitable orientation. The toddler-deterrent element 22, which is mechanically coupled to or otherwise disposed on the exterior wall surface 12 of the outer receptacle 8, is mated to at least one suitable means of the toddler-deterrent element 24 on the lid 26. In at least some embodiments, the lid 26 further includes a hinge or tether (not shown) to connect the lid 26 to the outer receptacle 8 to provide a closure and access to the openings of the outer and inner receptacles. In other embodiments, the lid 26 further includes a receptacle for receiving a latch or a prong. In at least some embodiments, the outer receptacle 8 is made of aluminum or another durable material such as plastic, and is preferably a cylindrical shape, but can also be made using other suitable material or combination of suitable materials and in other suitable shapes, including, for example, a variety of plastics, other alloys in addition to aluminum, or wood, and in a variety of shapes, including, but not limited to: a rectangular prism, a cone, a square box, or a triangular shape.

Figure 5:
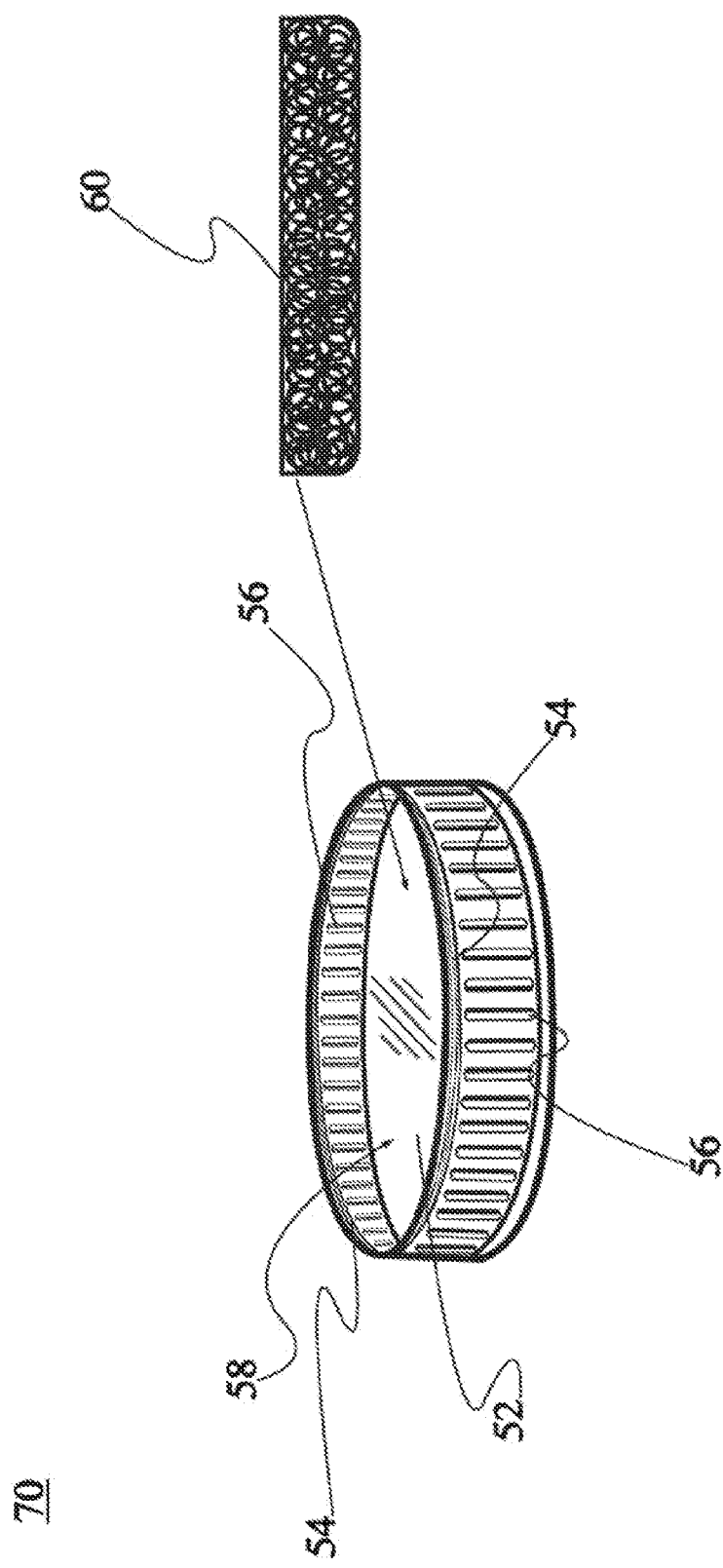
FIG. 5 is a front perspective view of the vented odor reduction compartment component of the waste scoop containment system of FIG. 1 shown with the odor reduction substance removed from the odor reduction compartment.

FIG. 5 is a front perspective view of the vented odor reduction compartment 70 of the waste scoop containment system 100 of FIG. 1 shown with a representation of an odor reduction substance 60 removed from the odor reduction compartment 70. In the illustrated embodiment, the removable odor reduction compartment 70 includes a bottom surface 52, the threaded grooves 54, at least one vent 56, and a top opening 58. The threaded grooves 54 are approximate the open top 58 of the odor reduction compartment 70 and are capable of interconnecting with the threaded grooves 18 of the outer receptacle 8. The odor reduction compartment 70 may be coupled and decoupled to the outer receptacle 8 via the threaded grooves 18 on the outer receptacle 8. The venting system 56 approximate the perimeter of the odor reduction compartment 70 aids in freshening the ambient air around the pet litter box and/or absorbing odors associated with the foul smell of waste. The outer receptacle 8 and the vented odor reduction compartment 70 are repeatably moveable between coupled and decoupled positions so that the user can replace or replenish the compartment with an odor reduction substance of the user's choosing.

It will be apparent to the Ordinary Artisan that the preferred implementation of the odor reduction compartment 70 is described and illustrated herein. However, it will be appreciated that the odor reduction compartment 70 arrangement of the present invention may be coupled to the outer receptacle 8 with a variety of means. For example, unthreaded groove systems, clasps, clips, or buckles may be used to couple the odor reduction compartment 70 to the outer receptacle 8. Further, the odor reduction compartment 70 may alternatively be coupled to the inner receptacle 32 or scoop apparatus 50 of the waste scoop containment system 100.

Figure 6:
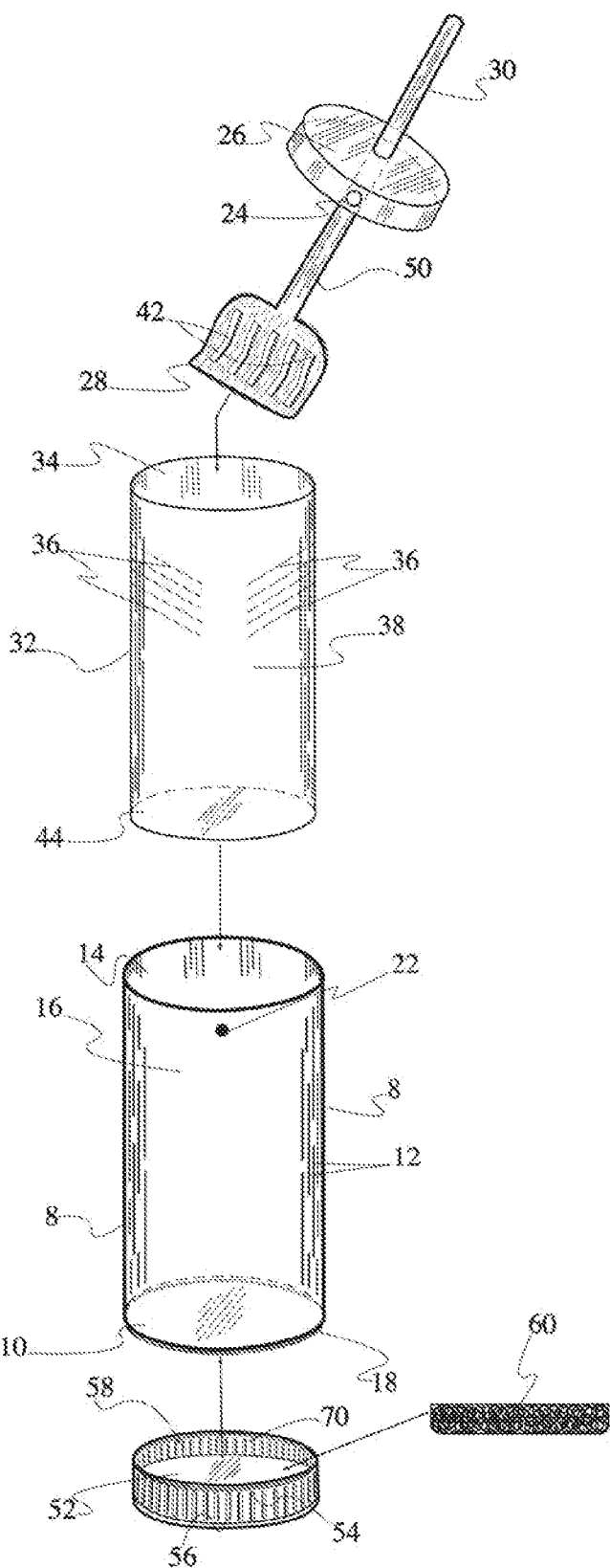
FIG. 6 is an exploded front perspective view of the components of the waste scoop containment system of FIG. 1.

FIG. 6 is an exploded front perspective view of the components of the outer receptacle 8, inner receptacle 32, odor reduction compartment 70 and scoop apparatus 50 of the waste scoop containment system 100 of FIG. 1. As illustrated in FIG. 6, the scoop apparatus 50 is housed within the inner receptacle 32. The inner receptacle 32 is housed within the outer receptacle 8 and is capable of cleaning the scoop apparatus 50 via the internal scraping element 36. The odor reduction compartment 70 couples to the outer receptacle 8 and houses the odor reduction substance 60, which is ideally selected by the owner. In use, when the lid 26 of the scoop apparatus 50 is placed over the open top 14 and encapsulates the scoop element 28 within the inner receptacle 32 and outer receptacle 8, at least one suitable means of a toddler-deterrent element 24 is mechanically coupled approximate the lid 26 is engaged with at least one suitable means of a toddler-deterrent element 22 coupled to the outer receptacle 8, whereby the waste scoop containment system 100 functions in a toddler-deterrent mode. Receptacle toddler-deterrent element 22 and lid toddler-deterrent element 24 are repeatably moveable between coupled and decoupled positions. The toddler-deterrent mode is deactivated when the scoop apparatus 50 is removed from the inner receptacle 32 and used. The toddler-deterrent mode is activated when the scoop apparatus 50 is placed back within the inner receptacle 32 and the toddler-deterrent element 24 approximate the lid 26 comes into contact with the toddler-deterrent element 22 on the exterior surface of the outer receptacle 8.

Based on the foregoing description, it will be readily understood by those persons skilled in the art that the present invention is susceptible of broad utility and application. Many embodiments and adaptations of the present invention other than those specifically described herein, as well as many variations, modifications, and equivalent arrangements, will be apparent from or reasonably suggested by the present invention and the foregoing descriptions thereof, without departing from the substance or scope of the present invention.

Accordingly, while the present invention has been described herein in detail in relation to one or more preferred embodiments, it is to be understood that this disclosure is only illustrative and exemplary of the present invention and is made merely for the purpose of providing a full and enabling disclosure of the invention. The foregoing disclosure is not intended to be construed to limit the present invention or otherwise exclude any such other embodiments, adaptations, variations, modifications or equivalent arrangements, the present invention being limited only by the claims appended hereto and the equivalents thereof.

What is claimed is:

1. A containment system to safely store waste and a waste scoop, comprising:
   (a) an outer receptacle including a bottom surface, at least one side wall, and an opening;
   (b) an inner receptacle including a bottom surface and at least one side wall housed within the outer receptacle and including an opening, wherein the inner receptacle is removable from the outer receptacle via the opening of the outer receptacle;
   (c) a scoop assembly including a scoop, a handle, and a lid, wherein the scoop is housed within the inner receptacle and is removable from the inner receptacle via the opening of the inner receptacle;
   (d) wherein when the scoop is housed within the inner receptacle and the inner receptacle is housed within the outer receptacle, the lid of the scoop assembly can be coupled to the outer receptacle so as to enclose the scoop and inner receptacle within the outer receptacle;
   (e) wherein when the scoop is housed within the inner receptacle and the inner receptacle is housed within the outer receptacle, the lid of the scoop assembly can be decoupled from the outer receptacle for removal of the scoop from the inner and outer receptacles; and
   (f) wherein the scoop assembly includes a first coupling element and the outer receptacle further includes a second coupling element capable of being joined with the first coupling element to secure a planar surface of the lid to cover the opening of the outer receptacle.

2. The containment system of claim 1, further comprising an air freshening compartment, capable of containing an odor reduction or odor freshener element, connected to the outer receptacle.

3. The containment system of claim 2, wherein the outer receptacle further includes a third coupling element, wherein the air freshening compartment includes a fourth coupling element, and wherein the fourth coupling element is capable of being joined with the third coupling element to connect the air freshening compartment to the bottom surface of the outer receptacle.

4. The containment system of claim 3, wherein:
   (a) the third coupling element includes at least one mechanical element to receive the fourth coupling element and abut a planar surface of the compartment;
   (b) the fourth coupling element includes at least one mechanical element to receive the third coupling element and to abut a planar surface of the compartment to the outer receptacle;
   (c) the compartment is removed from the outer receptacle by decoupling the third coupling element from the fourth coupling element; and
   (d) the third and fourth coupling elements are adapted to decouple for the replacement of an odor reduction or air fresher substance.

5. The containment system of claim 4, wherein the compartment includes a vent for the odor reduction element to continuously absorb odor.

6. The containment system of claim 4, wherein the compartment includes a vent for the odor freshener element to continuously release air freshener.

7. The containment system of claim 4, wherein, when the third and fourth coupling elements are coupled together, the containment system is capable of deterring a toddler.

8. The containment system of claim 2, wherein the compartment is removably coupled to the outer receptacle.

9. The containment system of claim 2, wherein the compartment can further include a hinge or tether to connect the compartment to the outer receptacle.

10. The containment system of claim 1, wherein, when the first and second coupling elements are coupled together, the containment system is capable of deterring a toddler.

11. The containment system of claim 1, wherein the inner receptacle includes a protrusion extending inward or upward and adapted to remove any residual waste on the scoop when the scoop is moved against the protrusion.

12. The containment system of claim 11, wherein the inner receptacle is disposable and replaceable.

13. The containment system of claim 11, wherein the protrusion is a flexible protrusion.

14. The containment system of claim 11, wherein the protrusion extends inwardly from opposing sides or upwardly from the bottom of the inner receptacle.

15. The containment system of claim 1, further comprising an air freshening compartment, capable of containing an odor reduction or odor freshener element, wherein the compartment is removably coupled to the lid.

16. The containment system of claim 1, wherein the first and second coupling elements are capable of being mechanically coupled and decoupled for coupling and decoupling of the lid and the outer receptacle together.

17. The containment system of claim 1, wherein the lid can further includes a hinge or tether to connect the lid to the outer receptacle to provide a closure and access to the openings of the outer and inner receptacles.

18. The containment system of claim 17, wherein, when the first and second coupling elements are coupled together, the containment system is capable of deterring a toddler.

19. A containment system to safely store waste and a waste scoop, comprising:
   (a) an outer receptacle including a bottom surface, at least one side wall, an opening, and a first coupling element;
   (b) an inner receptacle including a bottom surface and at least one side wall housed within the outer receptacle and including an opening, wherein the inner receptacle is removable from the outer receptacle via the opening of the outer receptacle;
   (c) a scoop assembly including a scoop, a handle, a lid, and a second coupling element, wherein the scoop is housed within the inner receptacle and is removable from the inner receptacle via the opening of the inner receptacle;
   (d) wherein when the scoop is housed within the inner receptacle and the inner receptacle is housed within the outer receptacle, the lid of the scoop assembly can be coupled to the outer receptacle so as to enclose the scoop and inner receptacle within the outer receptacle;
   (e) wherein when the scoop is housed within the inner receptacle and the inner receptacle is housed within the outer receptacle, the lid of the scoop assembly can be decoupled from the outer receptacle for removal of the scoop from the inner and outer receptacles; and
   (f) wherein the second coupling element is capable of being joined with the first coupling element to secure a planar surface of the lid to cover the opening of the outer receptacle.

* * * * *